US011819921B2

(12) United States Patent
Kong

(10) Patent No.: US 11,819,921 B2
(45) Date of Patent: Nov. 21, 2023

(54) METHOD AND APPARATUS FOR FORMING CUTTING BLADES

(71) Applicant: C4 Carbides Limited, Newmarket (GB)

(72) Inventor: Choon Yen Kong, Newmarket (GB)

(73) Assignee: C4 Carbides Limited, Newmarket (GB)

( * ) Notice: Subject to any disclaimer, the term of this patent is extended or adjusted under 35 U.S.C. 154(b) by 632 days.

(21) Appl. No.: 16/675,150

(22) Filed: Nov. 5, 2019

(65) Prior Publication Data

US 2020/0156186 A1 May 21, 2020

(30) Foreign Application Priority Data

Nov. 16, 2018 (GB) ...................... 1818678

(51) Int. Cl.
| | | |
|---|---|---|
| B22F 7/08 | (2006.01) | |
| B33Y 10/00 | (2015.01) | |
| B23K 26/12 | (2014.01) | |
| B23K 26/342 | (2014.01) | |
| B23D 65/00 | (2006.01) | |
| B22F 10/28 | (2021.01) | |
| B22F 10/32 | (2021.01) | |
| B22F 12/49 | (2021.01) | |
| B33Y 30/00 | (2015.01) | |
| B33Y 80/00 | (2015.01) | |
| B23K 26/14 | (2014.01) | |
| B22F 12/30 | (2021.01) | |
| B23K 101/20 | (2006.01) | |

(52) U.S. Cl.
CPC ............... *B22F 7/08* (2013.01); *B22F 10/28* (2021.01); *B22F 10/32* (2021.01); *B22F 12/30* (2021.01); *B23D 65/00* (2013.01); *B23K 26/123* (2013.01); *B23K 26/1224* (2015.10); *B23K 26/1464* (2013.01); *B23K 26/342* (2015.10); *B33Y 10/00* (2014.12); *B33Y 30/00* (2014.12); *B33Y 80/00* (2014.12); *B22F 12/49* (2021.01); *B23K 2101/20* (2018.08)

(58) Field of Classification Search
CPC .............................. B23K 26/342; B23D 65/00
See application file for complete search history.

(56) References Cited

U.S. PATENT DOCUMENTS

| | | | | |
|---|---|---|---|---|
| 2013/0333681 A1* | 12/2013 | Vaneecke | ............... | B23D 61/18 |
| | | | | 219/76.14 |
| 2016/0001401 A1* | 1/2016 | Dimter | ............... | B23K 26/0869 |
| | | | | 219/76.12 |
| 2017/0014959 A1* | 1/2017 | Nicolson | ................. | C23C 14/22 |
| 2017/0173735 A1* | 6/2017 | Hsu | ........................... | B22F 5/12 |

FOREIGN PATENT DOCUMENTS

| | | | |
|---|---|---|---|
| CN | 105562825 A | 5/2016 | |
| EP | 3117942 A1 | 1/2017 | |

* cited by examiner

*Primary Examiner* — Nathaniel E Wiehe
*Assistant Examiner* — Elizabeth M Kerr
(74) *Attorney, Agent, or Firm* — Reinhart Boerner Van Deuren s.c.

(57) ABSTRACT

There is provided a method of forming cutting blades using selective laser melting comprising positioning a first part of an elongate strip (30) with pre-formed teeth (32) within a powder bed (20), forming coating layers layer-by-layer to create a cutting surface on each pre-formed tooth by repeatedly depositing a layer of powder on the powder bed and scanning a laser beam over the deposited powder to fuse powder to the pre-formed teeth.

9 Claims, 2 Drawing Sheets

METHOD AND APPARATUS FOR FORMING CUTTING BLADES

Figure 1:
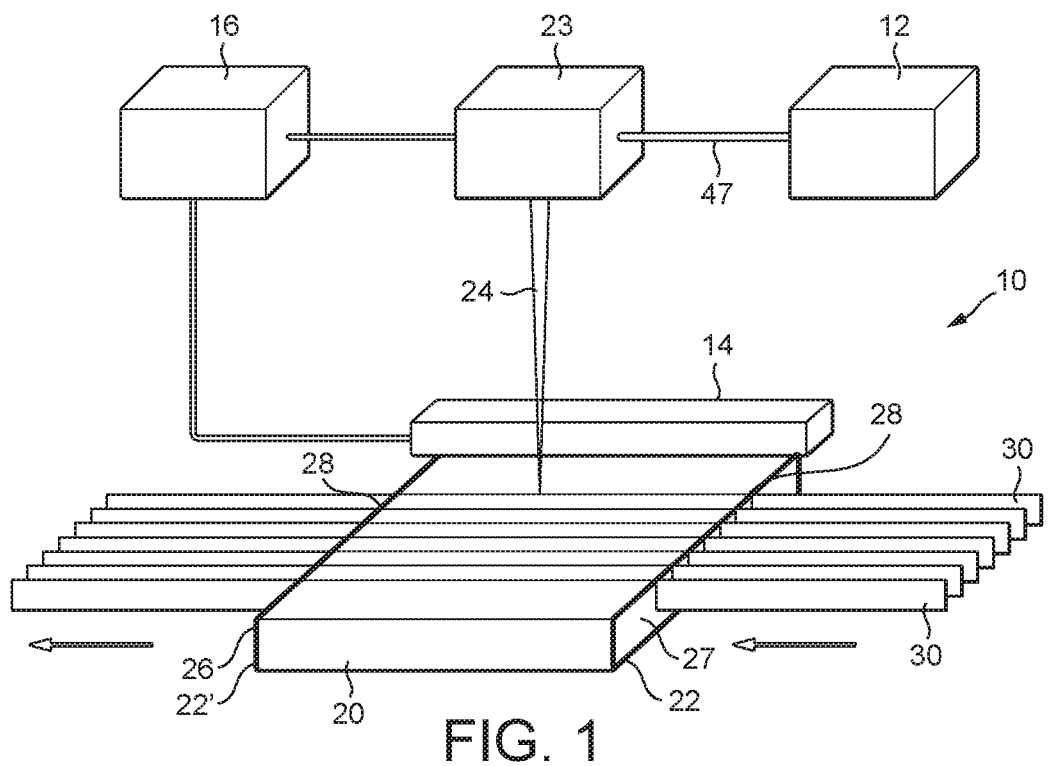

This application claims priority to United Kingdom Patent Application No.: GB 1818678.3, filed on Nov. 16, 2018, which is incorporated by reference for all purposes as if fully set forth herein.

FIELD OF THE INVENTION

This invention relates to a method and apparatus for forming cutting blades using selective laser melting.

BACKGROUND TO THE INVENTION

Cutting blades are typically formed by depositing abrasive cutting material onto elongate strips or discs with pre-formed teeth. Generally the teeth need to be ground or sharpened after the abrasive material has been deposited. This increases the time needed for manufacture. Further, to ensure that the cutting surface adheres appropriately to the teeth, winding materials need to be selected carefully which further complicates processing.

SUMMARY OF THE INVENTION

In accordance with a first aspect of the invention, there is provided a method of forming cutting blades using selective laser melting comprising positioning a first part of an elongate strip with pre-formed teeth within a powder bed, forming coating layers layer-by-layer to create a cutting surface on each pre-formed tooth by repeatedly depositing a layer of powder on the powder bed and scanning a laser beam over the deposited powder to fuse powder to the pre-formed teeth. This allows a cutting surface to be formed on each pre-formed tooth in a manner that avoids the need for grinding or sharpening of the cutting surface. Further, waste of the powder is avoided as excess powder is retained within the powder bed for re-use.

Preferably after creating the cutting surface, the method further comprises moving the elongate strip through the powder bed to present an adjoining part of the elongate strip with pre-formed teeth ready for the formation of coating layers.

The cutting surface may be substantially two-dimensional, such as is required for elongate saw blades or cutting discs. Alternatively the cutting surface can be three-dimensional. The use of selective laser melting allows the customisation of the shape of the cutting surface as a preferred profile for the cutting surface can be programmed into software controlling operation of the laser beam allowing customisation of the shape of the cutting surface.

The method may further comprise positioning multiple elongate strips within the powder bed. This improves overall throughput. Typically the strips will be spaced-apart and parallel to each other.

The powder may preferably comprise super-hard particles in a metal matrix. Super-hard particles may comprise, for example, Tungsten Carbide with Cobalt, borides or Aluminium Oxide. The matrix may comprise Cobalt, or Chromium or Titanium or mixtures of these materials.

The elongate strip will typically be formed of metal such as steel.

Deposition may take place with a flow of inert gas over the powder bed. Alternatively the powder bed may be placed in a vacuum or within a chamber filled with inert gas.

In accordance with another aspect of the invention, there is provided a cutting blade formed in accordance with the method and its preferred steps as described above.

In accordance with a further aspect of the invention, there is provided a cutting blade having a three-dimensional cutting surface formed in accordance with the method and its preferred steps as described above.

In accordance with a yet further aspect of the invention, there is provided apparatus for forming cutting blades using selective laser melting, the apparatus comprising a laser and a powder bed, wherein first and second opposing walls of the powder bed are provided with at least one pair of opposing slits with a sealing element located around each slit so as to prevent loss of powder from the powder bed whilst allowing passage of a cutting blade through the slits.

A plurality of pairs of opposing slits may be provided so as to allow processing of a plurality of cutting blades at once, with each slit sealed against powder loss by a sealing element. One elongate sealing element extending along the wall may be used to seal all slits along that wall or individual sealing elements may be used for individual slits.

Figure 2:
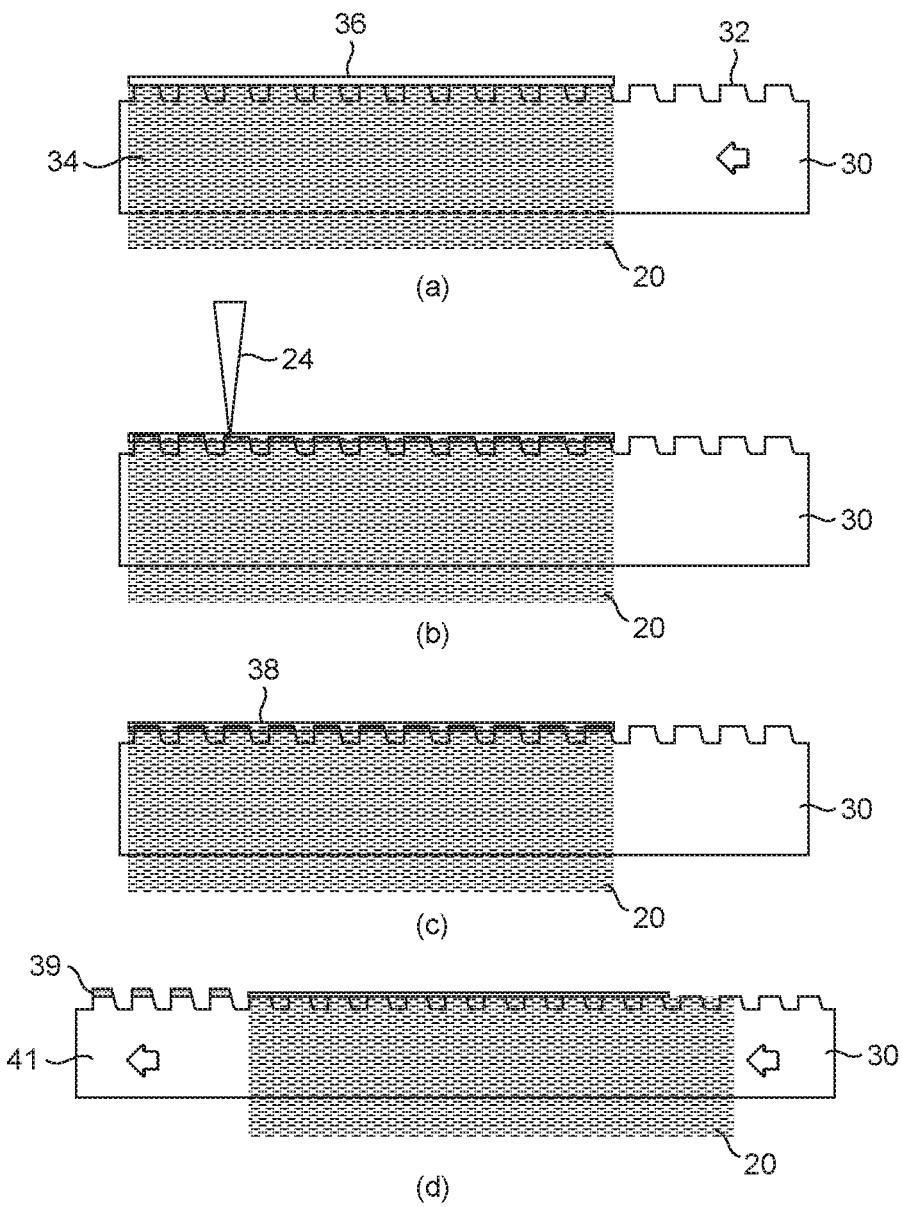
Figure 3:
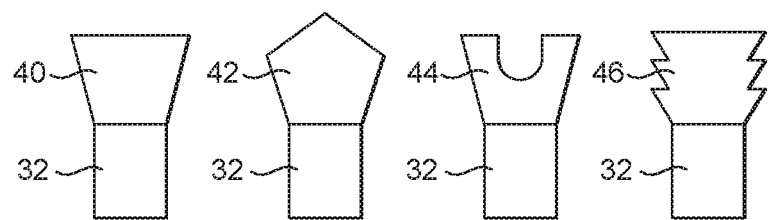

The invention will now be described, by way of example, and with reference to the accompanying drawings in which:

FIG. 1 shows a schematic diagram of a processing apparatus for saw blades;

FIGS. 2(a) to (d) show schematic diagrams of processing undertaken by the apparatus; and FIG. 3 shows cross-sections of different three-dimensional saw tooth profiles.

DESCRIPTION

FIG. 1 shows a schematic diagram of apparatus 10 used for selective laser melting comprising a laser module 12 and powder dispenser 14 under the control of processor or computer 16 and powder bed 20 including apertured edge seals 22, 22'. Laser module 12 comprises a device for generating a laser combined with a galvanometer scanner 23 forming part of laser beam delivery system 25 moves the highly focussed laser beam 24 across powder bed 20. Powder bed 20 is substantially rectangular with opposing edge walls 26, 27 formed with a plurality of vertical slits 28 overlain by apertured edge seals 22 such that metal strips 30 requiring processing can be fed through powder bed 20 without powder being released through slits 28. Typically powder bed 20 will have a width and length of 200 mm due to the limited scanning area of laser module 12. An additional laser and scanner can be employed to increase the throughput or increase the powder bed size.

Strips 30 are elongate steel strips formed with pre-formed teeth 32 as seen in FIG. 2. The pre-formed teeth 32 are shown as being substantially rectangular in profile but other profiles can be adopted if required. The processing sequence for strips 30 is shown in FIGS. 2(a), (b), (c) and (d).

At the start of processing as in FIG. 2(a), a portion 34 of pre-formed strip 30 is positioned within powder bed 20 and a thin layer 36 of around 0.05 to 0.10 mm of super-hard particles in a metal matrix, typically a sintered and agglomerated powder, is spread across the top surface of the powder bed so as to overlie pre-formed teeth 32.

The super-hard particles can be a mixture of Tungsten Carbide and Cobalt, typically 80% Tungsten carbide and 20% Cobalt, or borides, or aluminium oxide. The matrix can be Cobalt, or Chromium or Titanium or mixtures of these materials.

As shown in FIG. 2(b), galvanometer scanner 23 forming part of laser module 12 moves the highly focussed laser beam 24 across powder bed 20 and fuses powder to each of pre-formed teeth 32 to form a first coating layer. A new layer of powder 38 is then spread across and over the fused first coating layer, see FIG. 2(*c*), and the scanning of laser beam 24 and fusing of powder repeated again. This is continued for successive coating layers which are built layer-by-layer until the desired height and profile of the cutting edge 39 is achieved. Portion 34 of coated strip then moves out of powder bed 20, see FIG. 2(*d*), with the next adjoining section of strip fed into powder bed 20 for steps (a) to (d) to be repeated.

As shown in FIG. 1, multiple strips 30 can be processed at the same time, with the portion 34 of the elongate strips within the powder bed processed in one operation. When processing is complete, the strip moved along by a distance equal to the width of the powder bed so as to then process the next adjoining region of strip. Continuous automated processing is possible on an unmanned basis.

Processor 16 can be programmed with different profiles for the cutting surface and these may be substantially two-dimensional representing an extension of the pre-formed tooth 32 or three-dimensional to create customised three-dimensional shapes on top of the pre-formed tooth. FIG. 3 shows some cross-sections of three-dimensional cutting edges of saw tooth that can be achieved, 40 being an inverted frusto-conical cone on top of the pre-formed tooth, 42 having a pentagonal cross-section, 44 being a bifurcated shape with a substantially V-shaped cross-section and 46 representing a stack of three frusto-conical sections.

The ability to customise the configuration of the cutting surface formed from the build up of coating layers allows complex cutting shapes to be created depending on a customer's requirements, with software within processor 16 being configurable to modify the coating layers to achieve the desired profile.

Using the selective melting process means that the cutting surface can be formed as required into a final cutting profile ready to use, without the need for grinding or sharpening. This allows super-hard materials to be deposited as the coating layers to create the cutting surface as no to minimal grinding or sharpening is required to create the cutting surface, rather the final cutting surface, ready to use, is formed directly during the SLM process. Sometimes some grinding and sharpening may still be needed but this will be minimal and much less than is required for existing methods of manufacture of cutting blades.

Using a powder bed ensures that all powder is used in the manufacturing process without wastage of powder, which can be very expensive. The ranges of powder that can be used are extended as the SLM process can cope with much harder materials so much harder cutting edges can be provided.

The invention claimed is:

1. A method of forming cutting blades using selective laser melting comprising
   positioning a first part of an elongate strip with pre-formed teeth within a powder bed,
   forming, while the first part of the elongate strip remains positioned within the powder bed, coating layers layer-by-layer to create a cutting surface formed from multiple layers on each pre-formed tooth within the first part of the elongate strip by repeatedly-depositing a layer of powder on the powder bed, and
   scanning a laser beam over the deposited powder layer to fuse powder to the pre-formed teeth,
   wherein after creating the cutting surface formed from multiple layers on the first part of the elongate strip, the method further comprises moving the elongate strip through the powder bed by a distance equal to a width of the powder bed to present an adjoining part of the elongate strip with pre-formed teeth to repeat formation of the cutting surface formed from multiple layers.

2. A method of forming cutting blades according to claim 1, wherein the cutting surface is three-dimensional.

3. A method of forming cutting blades according to claim 1, further comprising positioning multiple elongate strips within the powder bed.

4. A method of forming cutting blades according to claim 3, wherein the strips are spaced-apart and parallel to each other.

5. A method of forming cutting blades according to claim 1, wherein the powder comprises particles of Tungsten carbide with Cobalt, or with borides or with Aluminum oxide.

6. A method of forming cutting blades according to claim 1, wherein a flow of inert gas occurs over the powder bed.

7. A method of forming cutting blades according to claim 1, wherein the powder bed is placed in a vacuum or within a chamber filled with inert gas.

8. A method of forming cutting blades according to claim 1, wherein the cutting surface is a final cutting profile ready for use.

9. A method of forming cutting blades according to claim 1, wherein each layer of powder deposited on the powder bed has a thickness in a range from 0.05 mm to 0.10 mm.

* * * * *